United States Patent
Otsu

(10) Patent No.: US 11,500,967 B2
(45) Date of Patent: Nov. 15, 2022

(54) ANTENNA DIRECTION ADJUSTMENT APPARATUS, ANTENNA DIRECTION ADJUSTMENT SYSTEM, AND METHOD THEREFOR

(71) Applicant: NEC CORPORATION, Tokyo (JP)

(72) Inventor: Makoto Otsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 410 days.

(21) Appl. No.: 16/624,562

(22) PCT Filed: May 31, 2018

(86) PCT No.: PCT/JP2018/020973
§ 371 (c)(1),
(2) Date: Dec. 19, 2019

(87) PCT Pub. No.: WO2019/003794
PCT Pub. Date: Jan. 3, 2019

(65) Prior Publication Data
US 2020/0134137 A1  Apr. 30, 2020

(30) Foreign Application Priority Data
Jun. 26, 2017  (JP) .............................. JP2017-124152

(51) Int. Cl.
*G06F 21/10* (2013.01)
*H01Q 1/12* (2006.01)
*H04W 48/16* (2009.01)

(52) U.S. Cl.
CPC ............. *G06F 21/10* (2013.01); *H01Q 1/125* (2013.01); *H04W 48/16* (2013.01); *G06F 2221/0775* (2013.01); *G06F 2221/0797* (2013.01)

(58) Field of Classification Search
None
See application file for complete search history.

(56) References Cited

U.S. PATENT DOCUMENTS 5,640,452 A * 6/1997 Murphy ................. H04N 7/165
  380/258
8,788,316 B1 * 7/2014 Karnik .................... H04L 63/08
  705/7.35
(Continued)

FOREIGN PATENT DOCUMENTS

EP       2270705 A2 * 1/2011 ............. G06F 21/10
JP   2010-136282 A    6/2010
(Continued)

OTHER PUBLICATIONS

International Search Report for PCT/JP2018/020973 dated Jul. 31, 2018 [PCT/ISA/210].

*Primary Examiner* — Jacob C. Coppola
(74) *Attorney, Agent, or Firm* — Sughrue Mion, PLLC

(57) ABSTRACT

An antenna direction adjustment apparatus (10) according to the present invention includes: auxiliary unit (14) for an adjustment of a direction of an antenna; acquisition unit (11) configured to acquire first information related to a first radio communication apparatus, and second information related to a second radio communication apparatus configured to perform opposite radio communication with the first radio communication apparatus; determination unit (12) configured to determine whether a use license of the auxiliary unit (14) is valid based on a combination of the first information and the second information; and instruction unit (13) configured to provide an instruction to operate the auxiliary unit (14) when it is determined that the use license is valid. This configuration makes it possible to provide an antenna direction adjustment apparatus capable of appropriately limiting an adjustment of a direction of an antenna by a license.

22 Claims, 12 Drawing Sheets

(56) References Cited

U.S. PATENT DOCUMENTS

| | | | | |
|---|---|---|---|---|
| 9,811,644 B1* | 11/2017 | Ahmed | ............... | H04W 4/02 |
| 2009/0006259 A1* | 1/2009 | Hsi | ............... | G06F 21/105 |
| | | | | 705/59 |
| 2011/0004756 A1* | 1/2011 | Caballero | ............... | G06F 21/10 |
| | | | | 713/168 |
| 2012/0064918 A1* | 3/2012 | Nakayasu | ............... | H04W 24/02 |
| | | | | 455/456.1 |
| 2012/0136998 A1* | 5/2012 | Hough | ............... | H04L 67/1076 |
| | | | | 709/225 |
| 2014/0030979 A1* | 1/2014 | Bowman | ............... | H04B 15/00 |
| | | | | 455/39 |
| 2014/0043985 A1* | 2/2014 | Hall | ............... | H04L 63/107 |
| | | | | 370/252 |
| 2014/0094184 A1* | 4/2014 | Jin | ............... | H04B 7/0871 |
| | | | | 455/452.1 |
| 2015/0189654 A1* | 7/2015 | Nakano | ............... | H04W 72/0453 |
| | | | | 455/450 |
| 2015/0382206 A1* | 12/2015 | Williams | ............... | H04W 72/02 |
| | | | | 370/329 |
| 2017/0041326 A1* | 2/2017 | Vedantam | ............... | G06F 21/10 |
| 2017/0171834 A1* | 6/2017 | Neves | ............... | H01Q 1/52 |
| 2017/0308684 A1* | 10/2017 | Morino | ............... | G06F 21/105 |
| 2018/0249468 A1* | 8/2018 | Erceg | ............... | H04W 52/243 |
| 2019/0215117 A1* | 7/2019 | Lee | ............... | H04L 5/0082 |
| 2020/0134137 A1* | 4/2020 | Otsu | ............... | H04W 12/08 |

FOREIGN PATENT DOCUMENTS

| | | | | |
|---|---|---|---|---|
| JP | 2016-039594 A | 3/2016 | | |
| WO | WO-9311480 A1 * | 6/1993 | ............... | G06F 11/34 |
| WO | 2009/075181 A1 | 6/2009 | | |
| WO | WO-2012058457 A1 * | 5/2012 | ............... | G06F 21/10 |
| WO | WO-2012159658 A1 * | 11/2012 | ............... | H04W 12/04 |
| WO | WO-2012172155 A1 * | 12/2012 | ............... | H04W 12/06 |
| WO | 2016/136119 A1 | 9/2016 | | |
| WO | WO-2018004641 A1 * | 1/2018 | ............... | H04W 16/06 |

* cited by examiner

| MANAGEMENT REGISTER | | |
|---|---|---|
| LICENSE No. 1 | POSITIONAL INFORMATION OF LOCATION A | POSITIONAL INFORMATION OF LOCATION B |

Fig. 6

| MANAGEMENT REGISTER | | |
|---|---|---|
| LICENSE No. 1 | POSITIONAL INFORMATION OF LOCATION A | POSITIONAL INFORMATION OF LOCATION B |
| LICENSE No. 2 | POSITIONAL INFORMATION OF LOCATION A | POSITIONAL INFORMATION OF LOCATION C |

Fig. 7

ANTENNA DIRECTION ADJUSTMENT APPARATUS, ANTENNA DIRECTION ADJUSTMENT SYSTEM, AND METHOD THEREFOR

CROSS REFERENCE TO RELATED APPLICATIONS

This application is a National Stage of International Application No. PCT/JP2018/020973 filed May 31, 2018, claiming priority based on Japanese Patent Application No. 2017-124152 filed Jun. 26, 2017, the disclosure of which is incorporated herein in its entirety by reference.

TECHNICAL FIELD

The present invention relates to an antenna direction adjustment apparatus, an antenna direction adjustment system, and a method therefor, and in particular, to an antenna direction adjustment apparatus used when a direction of an antenna is adjusted between opposed radio communication apparatuses, an antenna direction adjustment system including the antenna direction adjustment apparatus, and a method therefor.

BACKGROUND ART

In order to perform radio communication between opposed radio communication apparatuses such as P2P (Point to Point), it is important to adjust the direction of an antenna to an appropriate direction so that a reception level between the opposed radio communication apparatuses is maximized.

In recent years, as the frequency used for radio communication has increased, the beam width of an antenna has decreased, thus making the operation for adjusting the direction of the antenna difficult. Therefore, a method using an auxiliary tool for facilitating an adjustment of a direction of an antenna has been conceived.

Patent Literature 1 discloses a technique for adjusting the direction of an antenna that performs radio communication between a transmitting-side data transmission apparatus and a receiving-side data transmission apparatus using positional information of the transmission apparatuses.

Patent Literature 2 discloses a technique for assisting an adjustment of a direction of an antenna by displaying an antenna angle and reception quality information in association with each other.

CITATION LIST

Patent Literature

Patent Literature 1: Japanese Unexamined Patent Application Publication No. 2010-136282
Patent Literature 2: International Patent Publication No. WO 2016/136119

SUMMARY OF INVENTION

Technical Problem

However, although Patent Literature 1 and 2 disclose an auxiliary tool for adjusting the direction of an antenna, it is not possible to limit the use of the auxiliary tool by a license.

The present invention has been made to solve the above-described problems and an object thereof is to provide an antenna direction adjustment apparatus, an antenna direction adjustment system, and a method therefor that can appropriately limit an adjustment of a direction of an antenna by a license.

Solution to Problem

An antenna direction adjustment apparatus according to a first aspect of the present invention includes: auxiliary means for an adjustment of a direction of an antenna; acquisition means for acquiring first information related to a first radio communication apparatus, and second information related to a second radio communication apparatus configured to perform radio opposite communication with the first radio communication apparatus; determination means for determining whether a use license of the auxiliary means is valid based on a combination of the first information and the second information; and instruction means for providing an instruction to operate the auxiliary means when it is determined that the use license is valid.

An antenna direction adjustment system according to a second aspect of the present invention includes: a first radio communication apparatus; a first antenna connected to the first radio communication apparatus; a first antenna direction adjustment apparatus; a second radio communication apparatus configured to perform radio opposite communication with the first radio communication apparatus; a second antenna connected to the second radio communication apparatus; and a second antenna direction adjustment apparatus, in which the first antenna direction adjustment apparatus includes: a first auxiliary means for an adjustment of a direction of a first antenna; first acquisition means for acquiring first information related to the first radio communication apparatus, and second information related to the second radio communication apparatus; first determination means for determining whether a use license of the first auxiliary means is valid based on a combination of the first information and the second information; first instruction means for providing an instruction to operate the first auxiliary means when the first determination means determines that the use license is valid, and the second antenna direction adjustment apparatus includes: a second auxiliary means for an adjustment of a direction of the second antenna; second acquisition means for acquiring the first information and second information; second determination means for determining whether a use license of the second auxiliary means is valid based on a combination of the first information and the second information; and second instruction means for providing an instruction to operate the second auxiliary means when the second determination means determines that the use license is valid.

A method performed in an antenna direction adjustment apparatus according to a third aspect of the present invention includes: acquiring first information related to a first radio communication apparatus, and second information related to a second radio communication apparatus configured to perform radio opposite communication with the first radio communication apparatus; determining whether a use license of a function for an adjustment of a direction of an antenna is valid based on a combination of the first information and the second information; and providing an instruction to operate the function for the adjustment of a direction of an antenna when it is determined that the use license is valid.

A method performed in an antenna direction system according to a fourth aspect of the present invention includes causing a first antenna direction adjustment apparatus: to acquire first information related to a first radio communication apparatus, and second information related to a second radio communication apparatus configured to perform radio opposite communication with the first radio communication apparatus; to perform a first determination whether a use license of a function for an adjustment of a direction of the first antenna is valid based on a combination of the first information and the second information; and to provide an instruction to operate the function for the adjustment of direction of the first antenna when the first determination determines that the use license is valid, and causing a second antenna direction adjustment apparatus: to acquire the first information and the second information; to perform a second determination whether a use license of a function for an adjustment of a direction of the second antenna is valid based on a combination of the first information and the second information; and to provide an instruction to operate the function for the adjustment of a direction of the second antenna when the second determination determines that the use license is valid.

Advantageous Effects of Invention

According to the present invention, it is possible to provide an antenna direction adjustment apparatus, an antenna direction adjustment system, and a method therefor that can appropriately limit an adjustment of a direction of an antenna by a license.

BRIEF DESCRIPTION OF DRAWINGS

FIG. 6 is a diagram showing a configuration example of a management register according to the second example embodiment of the present invention;

FIG. 7 is a diagram showing a configuration example of a management register according to the second example embodiment of the present invention;

DESCRIPTION OF EMBODIMENTS

Example embodiments according to the present invention will be described hereinafter in detail with reference to the drawings. The same or corresponding elements are denoted by the same symbols throughout the drawings, and duplicated explanations are omitted as necessary for the sake of clarity of the explanations.

First Example Embodiment

Figure 1:
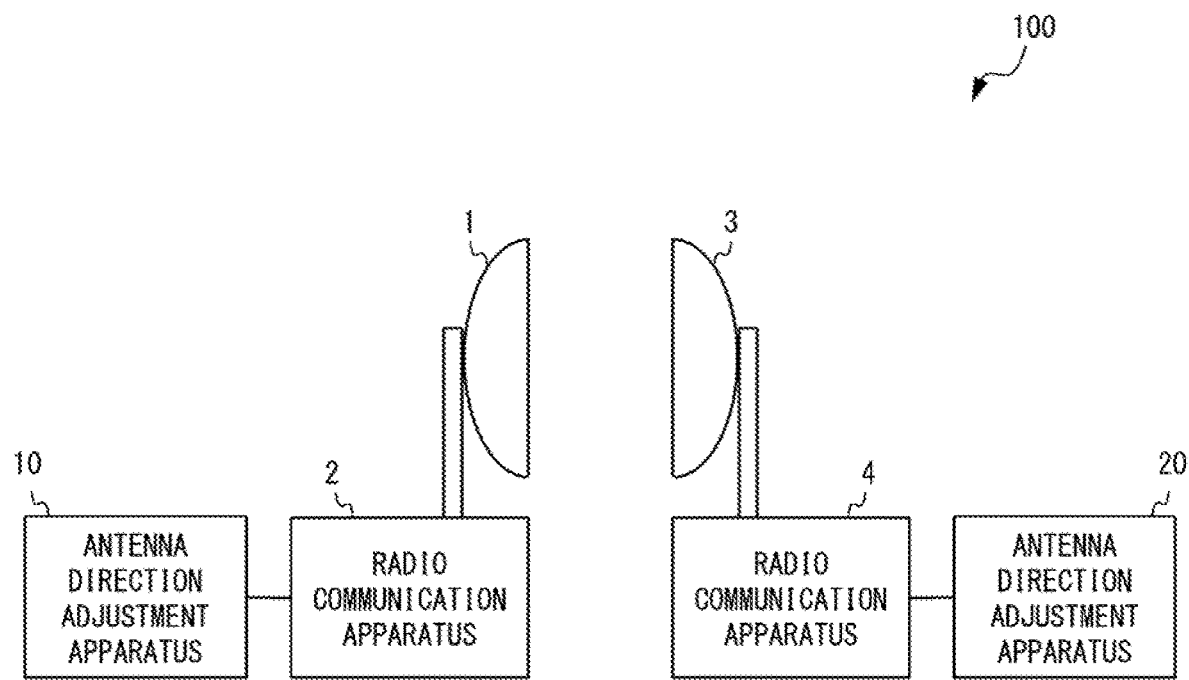
FIG. 1 is a block diagram showing a configuration example of an antenna direction adjustment system according to a first example embodiment of the present invention.

Firstly, a configuration example of an antenna direction adjustment system 100 according to a first example embodiment of the present invention is described with reference to a block diagram shown in FIG. 1. The antenna direction adjustment system 100 according to the first example embodiment includes an antenna 1, a radio communication apparatus 2, an antenna direction adjustment apparatus 10, an antenna 3, a radio communication apparatus 4, and an antenna direction adjustment apparatus 20.

Note that the antenna direction adjustment apparatus 10 is also referred to as a first antenna direction adjustment apparatus. Further, the antenna direction adjustment apparatus 20 is also referred to as a second antenna direction adjustment apparatus. Furthermore, a radio communication apparatus connected to the first antenna direction adjustment apparatus is also referred to as a first radio communication apparatus. In the example of FIG. 1, the first radio communication apparatus is the radio communication apparatus 2. Further, a radio communication apparatus connected to the second antenna direction adjustment apparatus is also referred to as a second radio communication apparatus. In the example of FIG. 1, the second radio communication apparatus is the radio communication apparatus 4. Further, an antenna connected to the first radio communication apparatus is also referred to as a first antenna. In the example of FIG. 1, the first antenna is the antenna 1. Further, an antenna connected to the second radio communication apparatus is also referred to as a second antenna. In the example of FIG. 1, the second antenna is the antenna 3.

The antenna 1 and the radio communication apparatus 2 are connected to each other. Further, the antenna 3 and the radio communication apparatus 4 are connected to each other. The antennas 1 and 3 are, for example, parabolic antennas. The antennas 1 and 3 are located so that they face each other. The radio communication apparatuses 2 and 4 perform opposite radio communication by P2P or the like through the antennas 1 and 3. Note that the opposite radio communication between the radio communication apparatuses 2 and 4 is performed in a frequency band such as a millimeter-wave band.

The antenna direction adjustment apparatuses 10 and 20 are, for example, Personal Computers (PC) or tablet terminals to which an application related to adjustment of a direction of an antenna is downloaded.

The antenna direction adjustment apparatus 10 and the radio communication apparatus 2 are connected to each other wirelessly or through a wire. Further, the antenna direction adjustment apparatus 20 and the radio communication apparatus 4 are connected to each other wirelessly or through a wire.

Figure 2:
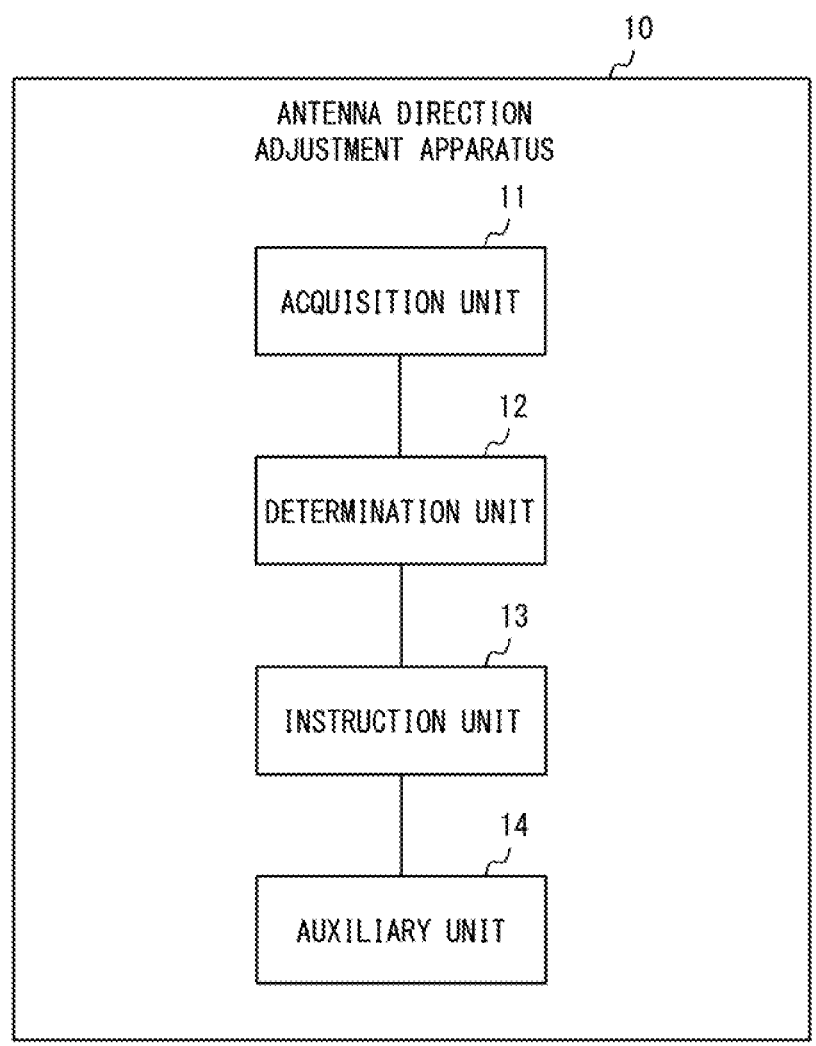
FIG. 2 is a block diagram showing a configuration example of an antenna direction adjustment apparatus according to the first example embodiment of the present invention.

Next, a configuration example of the antenna direction adjustment apparatus 10 according to the first example embodiment of the present invention is described with reference to a block diagram shown in FIG. 2. The antenna direction adjustment apparatus 10 includes an acquisition unit 11, a determination unit 12, an instruction unit 13, and an auxiliary unit 14.

The acquisition unit 11 acquires first information related to the radio communication apparatus 2 and second information related to the radio communication apparatus 4. Note that the first information is, for example, positional information or apparatus information related to the radio communication apparatus 2. Note that the second information is, for example, positional information or apparatus information related to the radio communication apparatus 4. Note that the acquisition unit 11 acquires the second information from the antenna direction adjustment apparatus 20, for example, through a mobile phone line or an Internet line.

Note that the acquisition unit 11 may acquire the second information from the antenna direction adjustment apparatus 20 by opposite radio communication through the antennas 1 and 3. In this case, the acquisition unit 11 may acquire the second information from the antenna direction adjustment apparatus 20 after the directions of the antennas 1 and 3 are roughly adjusted, for example, by visual observation.

Then, the acquisition unit 11 outputs the acquired first information and second information to the determination unit 12.

The determination unit 12 receives the first information and the second information from the acquisition unit 11. Further, the determination unit 12 determines whether the use license of the auxiliary unit 14 is valid based on the combination of the first information and the second information. Then, the determination unit 12 outputs a determination result on whether the use license of the auxiliary unit 14 is valid to the instruction unit 13.

The instruction unit 13 receives the determination result from the determination unit 12. Then, the instruction unit 13 provides an instruction to operate the auxiliary unit 14 when it is determined that the use license of the auxiliary unit 14 is valid.

The auxiliary unit 14 is a functional unit for an adjustment of a direction of the antenna 1. For example, the auxiliary unit 14 has a function of assisting the adjustment of the direction of the antenna 1 by displaying the angle of the antenna 1 and the reception electric field intensity of the signal received through the antenna 1 in association with each other. Note that the function for the adjustment of the direction of the antenna 1 provided in the auxiliary unit 14 is not limited to the aforementioned function. For example, the auxiliary unit 14 may have a function of adjusting the direction of the antenna 1 by driving a motor or the like (not shown). The auxiliary unit 14 activates the function for the adjustment of the direction of the antenna 1 when it is instructed to do so by the instruction unit 13.

Note that the configuration of the antenna direction adjustment apparatus 20 is the same as that of the antenna direction adjustment apparatus 10. That is, the antenna direction adjustment apparatus 20 includes an acquisition unit 21, a determination unit 22, an instruction unit 23, and an auxiliary unit 24. Further, the antenna direction adjustment apparatus 20 is similar to the antenna direction adjustment apparatus 10 except that an object to be connected is not the radio communication apparatus 2 but the radio communication apparatus 4 and that the antenna of which the direction is to be adjusted is not the antenna 1 but the antenna 3, and thus the illustration and the description thereof are omitted.

Figure 3:
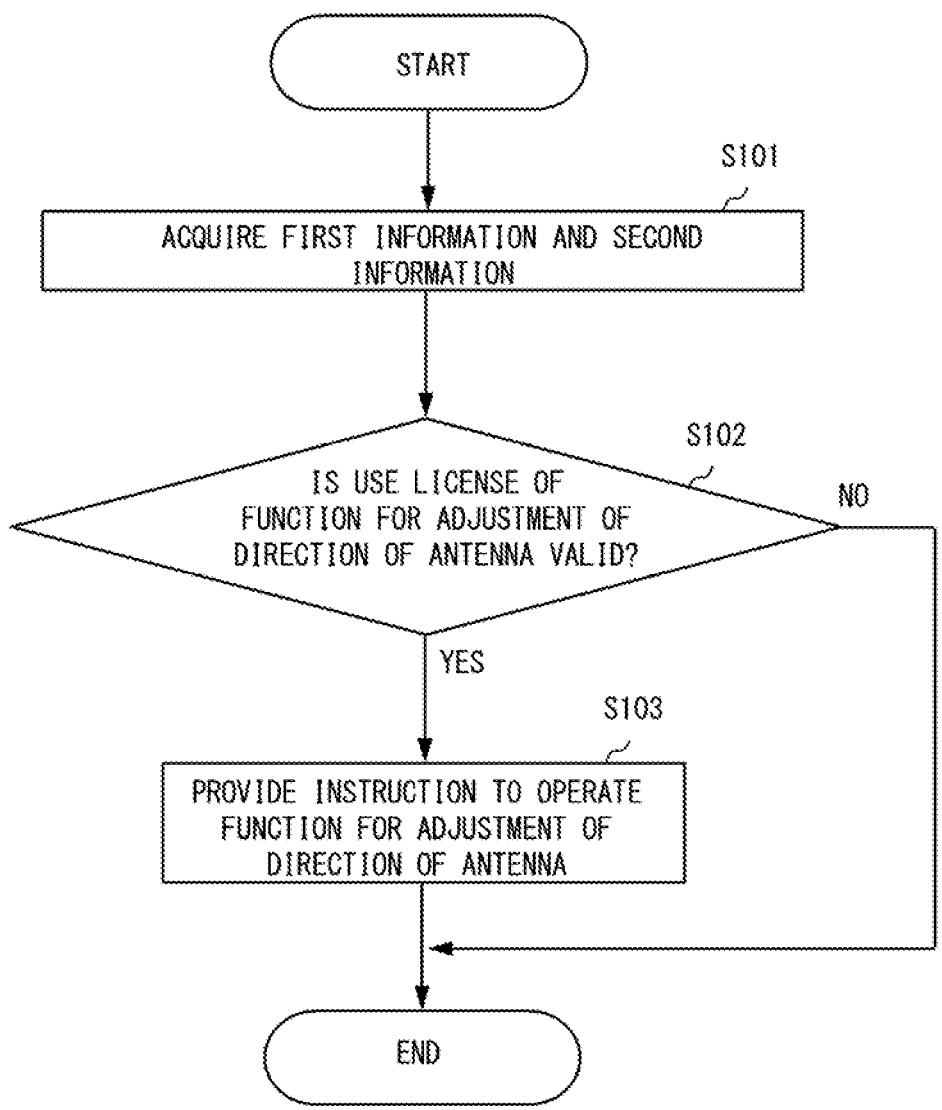
FIG. 3 is a flowchart showing an example of processes performed by the antenna direction adjustment apparatus according to the first example embodiment of the present invention.

Next, the antenna direction adjustment apparatus 10 according to the first example embodiment of the present invention is described with reference to a flowchart shown in FIG. 3.

First, in the antenna direction adjustment apparatus 10, the acquisition unit 11 acquires first information related to the radio communication apparatus 2 and second information related to the radio communication apparatus 4 (Step S101).

Next, in the antenna direction adjustment apparatus 10, the determination unit 12 determines whether the use license of the function (the auxiliary unit 14) related to the adjustment of the direction of the antenna 1 is valid based on the combination of the first information and the second information (Step S102).

In the antenna direction adjustment apparatus 10, if it is determined that the use license of the function for the adjustment of the direction of the antenna 1 is valid (YES in Step S102), the instruction unit 13 provides an instruction to operate the function for the adjustment of the direction of the antenna 1 (Step S103).

On the other hand, if it is determined that the use license of the function for the adjustment of the direction of the antenna 1 is not valid (NO in Step S102), the process in Step S103 is not performed.

As described above, the antenna direction adjustment apparatus 10 according to the first example embodiment of the present invention includes: the auxiliary unit 14 for an adjustment of a direction of an antenna; the acquisition unit 11 configured to acquire first information related to the radio communication apparatus 2, and second information related to the radio communication apparatus 4 configured to perform radio opposite communication with the radio communication apparatus 2; the determination unit 12 configured to determine whether a use license of the auxiliary unit 14 is valid based on a combination of the first information and the second information; and the instruction unit 13 configured to provide an instruction to operate the auxiliary unit 14 when the determination unit 12 determines that the use license is valid. In this way, in the antenna direction adjustment apparatus 10 according to the first example embodiment, it is possible to operate the auxiliary unit 14 when the use license of the auxiliary unit 14 is valid. Accordingly, in the antenna direction adjustment apparatus 10, it is possible to appropriately limit an adjustment of a direction of an antenna by a license.

Second Example Embodiment

Next, an antenna direction adjustment system 100A according to a second example embodiment of the present invention is described. The antenna direction adjustment system 100A according to the second example embodiment uses positional information as first information and the second information. The antenna direction adjustment system 100A includes a first antenna, a first radio communication apparatus, an antenna direction adjustment apparatus 10A, a second antenna, a second radio communication apparatus, and an antenna direction adjustment apparatus 20A.

Figure 4:
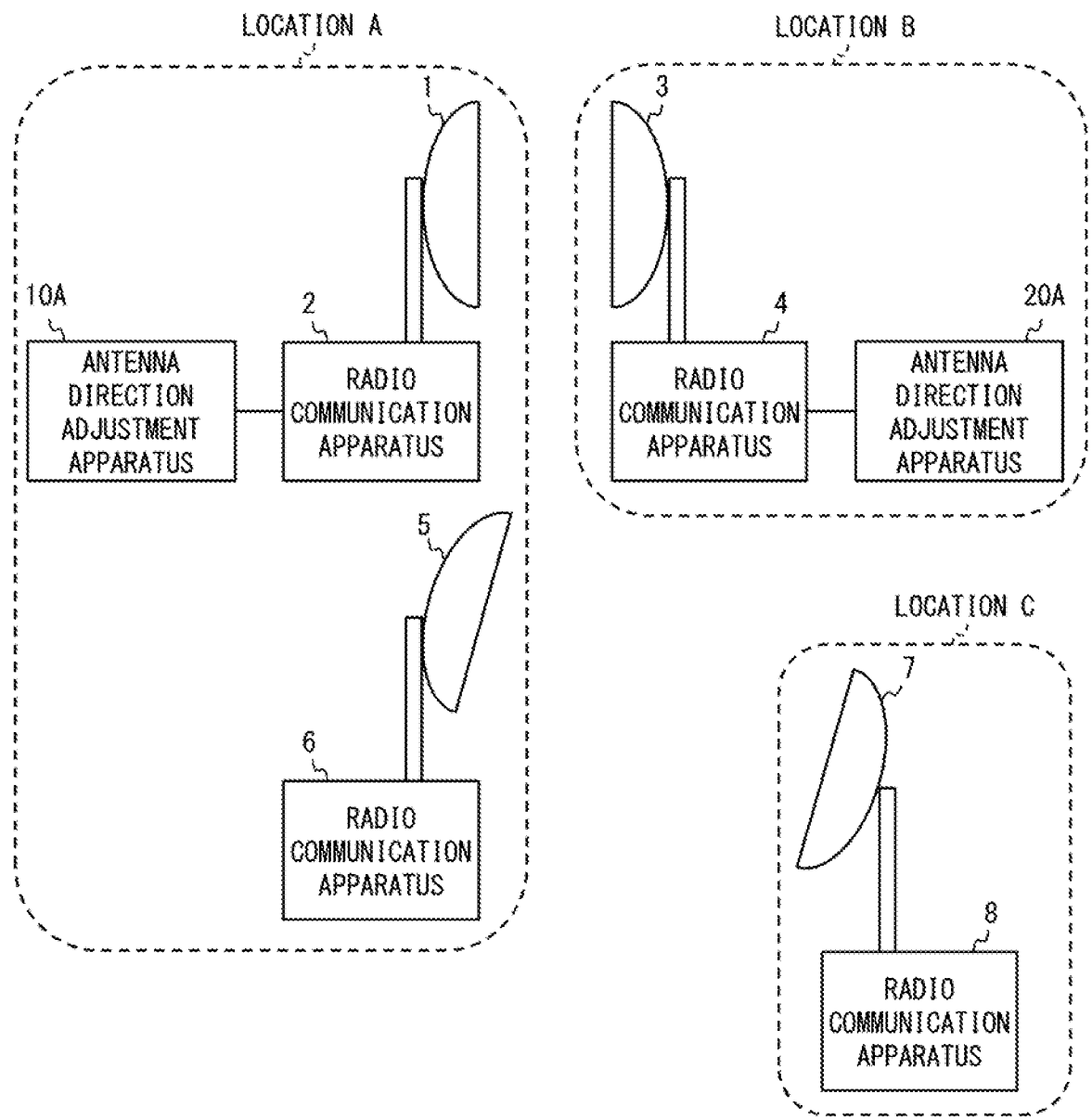
FIG. 4 is a block diagram showing an example of an installation environment of an antenna and a radio communication apparatus according to a second example embodiment of the present invention.

In the second example embodiment, an example of an installation environment of the antenna and the radio communication apparatus in FIG. 4 is described. In the example of FIG. 4, the antenna 1, the radio communication apparatus 2, an antenna 5, and a radio communication apparatus 6 are installed at a location A. Further, the antenna 3 and the radio communication apparatus 4 are installed at a location B. Furthermore, an antenna 7 and a radio communication apparatus 8 are installed at a location C.

In FIG. 4, the radio communication apparatus 2 is connected to the antenna direction adjustment apparatus 10A, and the radio communication apparatus 4 is connected to the antenna direction adjustment apparatus 20A. In this connection state, the first antenna, the first radio communication apparatus, the second antenna, and the second radio communication apparatus are the antenna 1, the radio communication apparatus 2, the antenna 3, and the radio communication apparatus 4, respectively.

Further, the antenna 5 and the radio communication apparatus 6 are connected to each other, and the antenna 7 and the radio communication apparatus 8 are connected to each other. Further, the antennas 5 and 7 are, for example, parabolic antennas. The antennas 5 and 7 are located so that they face each other. The radio communication apparatuses 6 and 8 perform opposite radio communication through the antennas 5 and 7.

Figure 5:
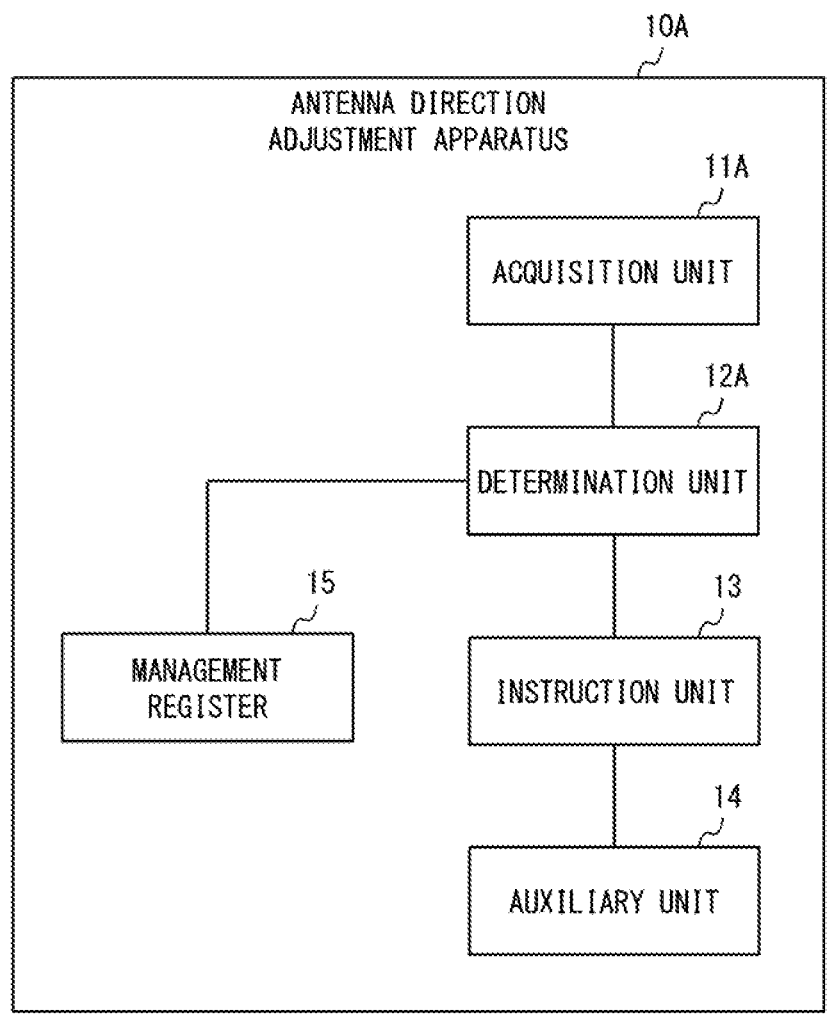
FIG. 5 is a block diagram showing a configuration example of the antenna direction adjustment apparatus according to the second example embodiment of the present invention.

Next, a configuration example of the antenna direction adjustment apparatus 10A is described with reference to a block diagram shown in FIG. 5. The antenna direction adjustment apparatus 10A includes an acquisition unit 11A, a determination unit 12A, the instruction unit 13, the auxiliary unit 14, and management register 15. Note that the configurations of the instruction unit 13 and the auxiliary unit 14 are similar to those in the antenna direction adjustment apparatus 10 according to the first example embodiment, and the descriptions thereof are thus omitted. Note that as in the case of the antenna direction adjustment apparatus 10A, the antenna direction adjustment apparatus 20A includes an acquisition unit 21A, a determination unit 22A, the instruction unit 23, the auxiliary unit 24, and a management register 25. Note that the management registers 15 and 25 may be common storage means such as a memory. Further, the management registers 15 and 25 may be external storages such as a magnetic disk.

The acquisition unit 11A acquires first positional information related to the radio communication apparatus 2, and second positional information related to the radio communication apparatus 4.

Note that the acquisition unit 11A acquires, as first positional information related to the radio communication apparatus 2, the positional information of the location A, for example, by a Global Positioning System (GPS) function provided in the antenna direction adjustment apparatus 10A. Further, the acquisition unit 21A acquires, as second positional information related to the radio communication apparatus 4, the positional information of the location B, for example, by a GPS function provided in the antenna direction adjustment apparatus 20A.

Further, the acquisition unit 11A acquires the second positional information (the positional information of the location B) related to the radio communication apparatus 4 from the antenna direction adjustment apparatus 20A, for example, using a mobile phone line or an Internet line.

Then, the acquisition unit 11A outputs the acquired first positional information and second positional information to the determination unit 12A.

The determination unit 12A receives the first positional information and the second positional information from the acquisition unit 11A. Further, the determination unit 12A determines whether the use license of the auxiliary unit 14 is valid based on the combination of the first positional information and the second positional information. The determination unit 12A determines whether the use license of the auxiliary unit 14 is valid, for example, by referring to the management register 15.

A configuration example of the management register 15 is described below with reference to FIG. 6. The management register 15 stores a combination of the positional information items having the use license for the auxiliary unit 14. In the example of FIG. 6, the combination of the positional information of the location A and the positional information of the location B is stored as a license No. 1 in the management register 15.

When the combination of the first positional information and the second positional information received from the acquisition unit 11A matches the combination of the positional information items stored in the management register 15, the determination unit 12A determines that the use license of the auxiliary unit 14 is valid. In the case of the example of FIG. 4, the first positional information is the positional information of the location A, and the second positional information is the positional information of the location B. That is, as the combination of the first positional information and the second positional information matches the combination of the positional information of the license No. 1, the determination unit 12A determines that the use license of the auxiliary unit 14 is valid. By doing so, in the antenna direction adjustment apparatus 10A, it is possible to operate the function for the adjustment of the direction of the antenna 1 by the license No. 1.

Next, two examples of a method for managing the number of licenses of the antenna direction adjustment apparatus 10A is described.

The first example is a method for managing the number of licenses by the antenna direction adjustment apparatus 10A. In this example, the management register 15 stores remaining license number information in addition to the combination of the positional information items. Note that the remaining license number information is information indicating the number of remaining licenses that are not used.

When the combination of the first positional information and the second positional information does not match the combination of the positional information items stored in the management register 15, the determination unit 12A checks the remaining license number information in the management register 15.

For example, in FIG. 4, when the antenna direction adjustment apparatus 10A is connected to the radio communication apparatus 6 and the antenna direction adjustment apparatus 20A is connected to the radio communication apparatus 8, the first positional information is the positional information of the location A, and the second positional information is the positional information of the location C. Then, as the combination of the positional information of the location A and the positional information of the location C does not match the combination of the positional information items stored in the management register 15 in the example of FIG. 6, the determination unit 12A checks the remaining license number information in the management register 15.

Further, when there is a remaining license, the determination unit 12A reduces the number of remaining licenses of the remaining license number information by one, and determines that the use license of the auxiliary unit 14 is valid. Further, when there is no remaining license, the determination unit 12A determines that the use license of the auxiliary unit 14 is not valid.

Further, the determination unit 12A stores the combination of the first positional information and the second positional information in the management register 15 when the determination unit 12A reduces the number of remaining licenses of the remaining license number information by one. By doing so, the combination of the first positional information and the second positional information, that is, the combination of the positional information of the location A and the positional information of the location C, is stored as a license No. 2 in the management register 15, for example, as in the case of FIG. 7.

Note that the determination unit 12A outputs, to the instruction unit 13, information indicating that the use license of the auxiliary unit 14 has become valid.

Note that when there is no remaining license, the determination unit 12A may display the information indicating that there is no remaining license on a display unit (not shown). By doing so, it is possible to inform a user that there is no remaining license.

Figure 8:
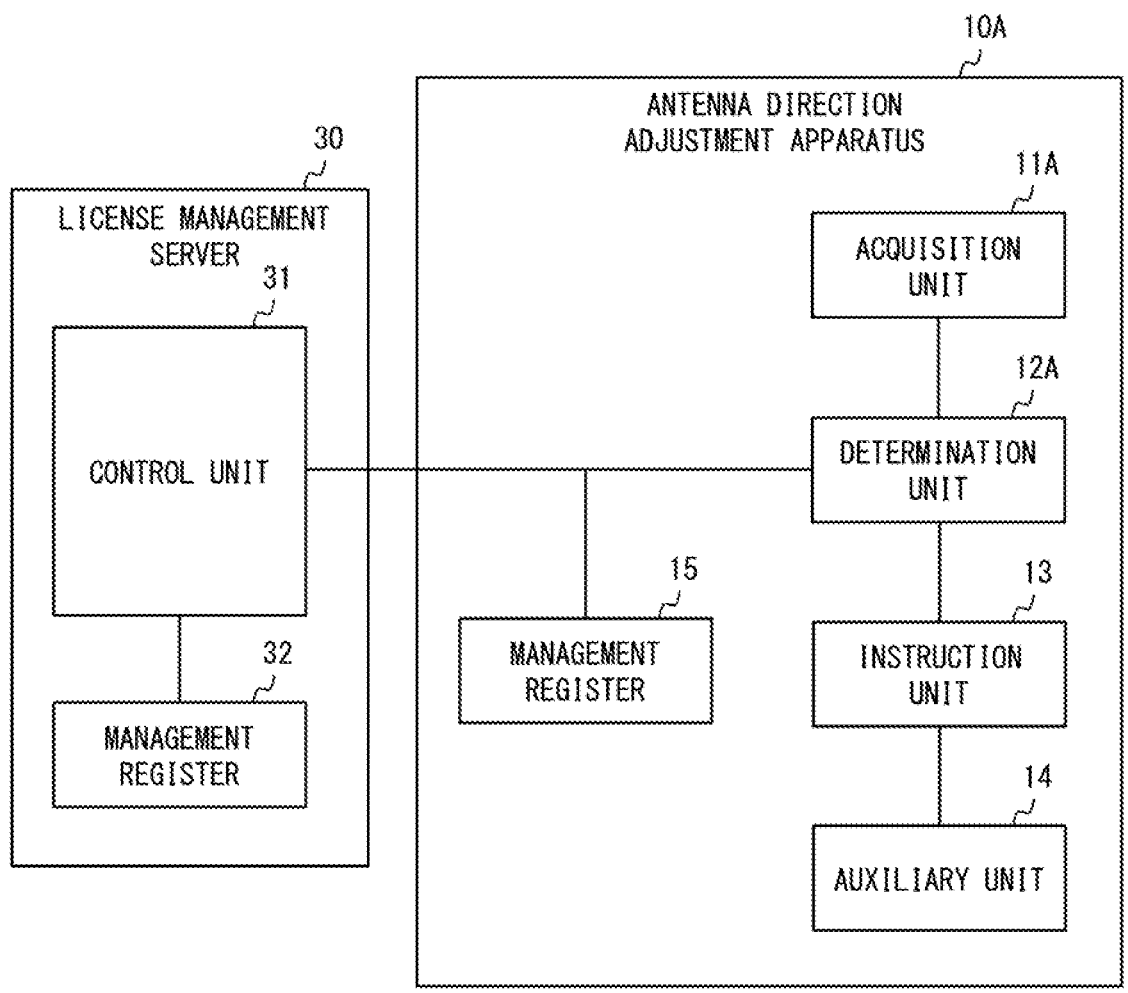
FIG. 8 is a block diagram for explaining a method for managing the number of licenses of the antenna direction adjustment apparatus according to the second example embodiment of the present invention by a license management server.

Next, the second example of a method for managing the number of licenses is described. The second example is a method for managing the number of licenses by a license management server 30 shown in FIG. 8. Note that in this method, the antenna direction adjustment system 100A includes the license management server 30.

The license management server 30 includes a control unit 31 and a management register 32. The remaining license number information in each of a plurality of antenna direction adjustment apparatuses are stored in the management register 32. Note that the management register 32 may be common storage means such as a memory. Further, the management register 32 may be external storage such as a magnetic disk. Note that the antenna direction adjustment apparatus 10A is connected to the license management server 30, for example, through a mobile phone line or an Internet line.

When the combination of the first positional information and the second positional information does not match the combination of the positional information items stored in the management register 15, the determination unit 12A transmits a license request including the combination of the first positional information and the second positional information to the license management server 30.

When the control unit 31 of the license management server 30 receives the license request, it determines whether there is a remaining license of the antenna direction adjustment apparatus 10A by referring to the management register 32. Further, when there is a remaining license of the antenna direction adjustment apparatus 10A, the control unit 31 transmits a license response indicating that the license is valid to the antenna direction adjustment apparatus 10A, and reduces the number of remaining licenses of the antenna direction adjustment apparatus 10A in the management register 32 by one.

When the determination unit 12A receives the license response indicating that the license is valid from the license management server 30, the determination unit 12A determines that the use license of the auxiliary unit 14 is valid. Further, when the determination unit 12A does not receive the license response indicating that the license is valid, the determination unit 12A determines that the use license of the auxiliary unit 14 is not valid. Note that the case in which the license response indicating that the license is valid is not received is, for example, the case in which the license response indicating that the license is valid is not received within a predetermined time, or the case in which the license response indicating that there is no remaining license is received.

Further, when the determination unit 12A receives the license response indicating that the license is valid from the license management server 30, the determination unit 12A stores the combination of the first positional information and the second positional information in the management register 15. Note that the determination unit 12A outputs, to the instruction unit 13, information indicating that the use license of the auxiliary unit 14 has become valid.

Note that when the determination unit 12A does not receive the license response indicating that the license is valid, the determination unit 12A may display the information indicating that there is no remaining license on the display unit (not shown). By doing so, it is possible to inform a user that there is no remaining license.

Note that the control unit 31 may include a license key in the license response and transmit the license key to the antenna direction adjustment apparatus 10A. In this case, the determination unit 12A outputs the received license key to the instruction unit 13. Then, the instruction unit 13 operates the auxiliary unit 14 by inputting the received license key.

Note that the license key may be encrypted with a common key in the license management server 30 and provided to the antenna direction adjustment apparatus 10A. In this case, the antenna direction adjustment apparatus 10A uses the license key by decrypting it with the common key.

Figure 9:
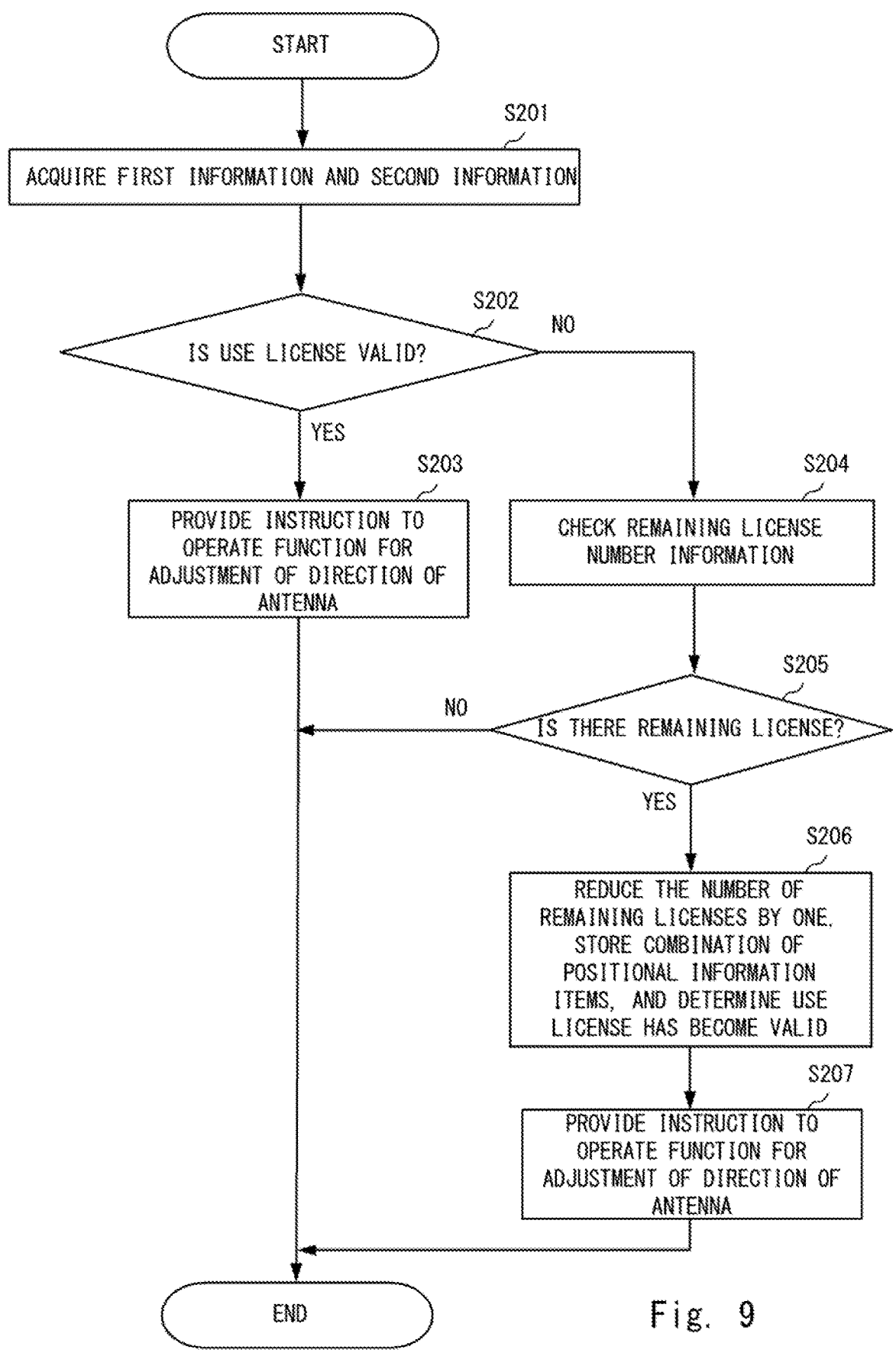
FIG. 9 is a flowchart showing an example of processes performed by the antenna direction adjustment apparatus according to the second example embodiment of the present invention.

Next, an example of processes performed by the antenna direction adjustment apparatus 10A according to the second embodiment is described with reference to a flowchart shown in FIG. 9. Note that FIG. 9 is a flowchart related to a method for managing the number of licenses by the antenna direction adjustment apparatus 10A.

First, in the antenna direction adjustment apparatus 10A, the acquisition unit 11A acquires the first positional information related to the first radio communication apparatus, and the second positional information related to the second radio communication apparatus (Step S201).

Next, in the antenna direction adjustment apparatus 10A, the determination unit 12A determines whether the use license of the function (the auxiliary unit 14) for the adjustment of the direction of the antenna 1 is valid based on the combination of the first positional information and the second positional information (Step S202).

In the antenna direction adjustment apparatus 10A, if it is determined that the use license of the function for the adjustment of the direction of the antenna 1 is valid (YES in Step S202), the instruction unit 13 provides an instruction to operate the function for the adjustment of the direction of the antenna 1 (Step S203).

On the other hand, in the antenna direction adjustment apparatus 10A, if it is determined that the use license of the function for the adjustment of the direction of the antenna 1 is not valid, the determination unit 12A checks the remaining license number information in the management register 15 (Step S204), and determines whether there is a remaining license (Step S205).

If there is no remaining license (NO in Step S205), the process ends. On the other hand, in the antenna direction adjustment apparatus 10A, if there is a remaining license (YES in Step S205), the determination unit 12A reduces the number of remaining licenses of the remaining license number information in the management register 15 by one, stores the combination of the first positional information and the second positional information in the management register 15, and determines that the use license of the function for the adjustment of the direction of the antenna 1 has become valid (Step S206).

Then, in the antenna direction adjustment apparatus 10A, the instruction unit 13 provides an instruction to operate the function for the adjustment of the direction of the antenna 1 (Step S207).

Figure 10:
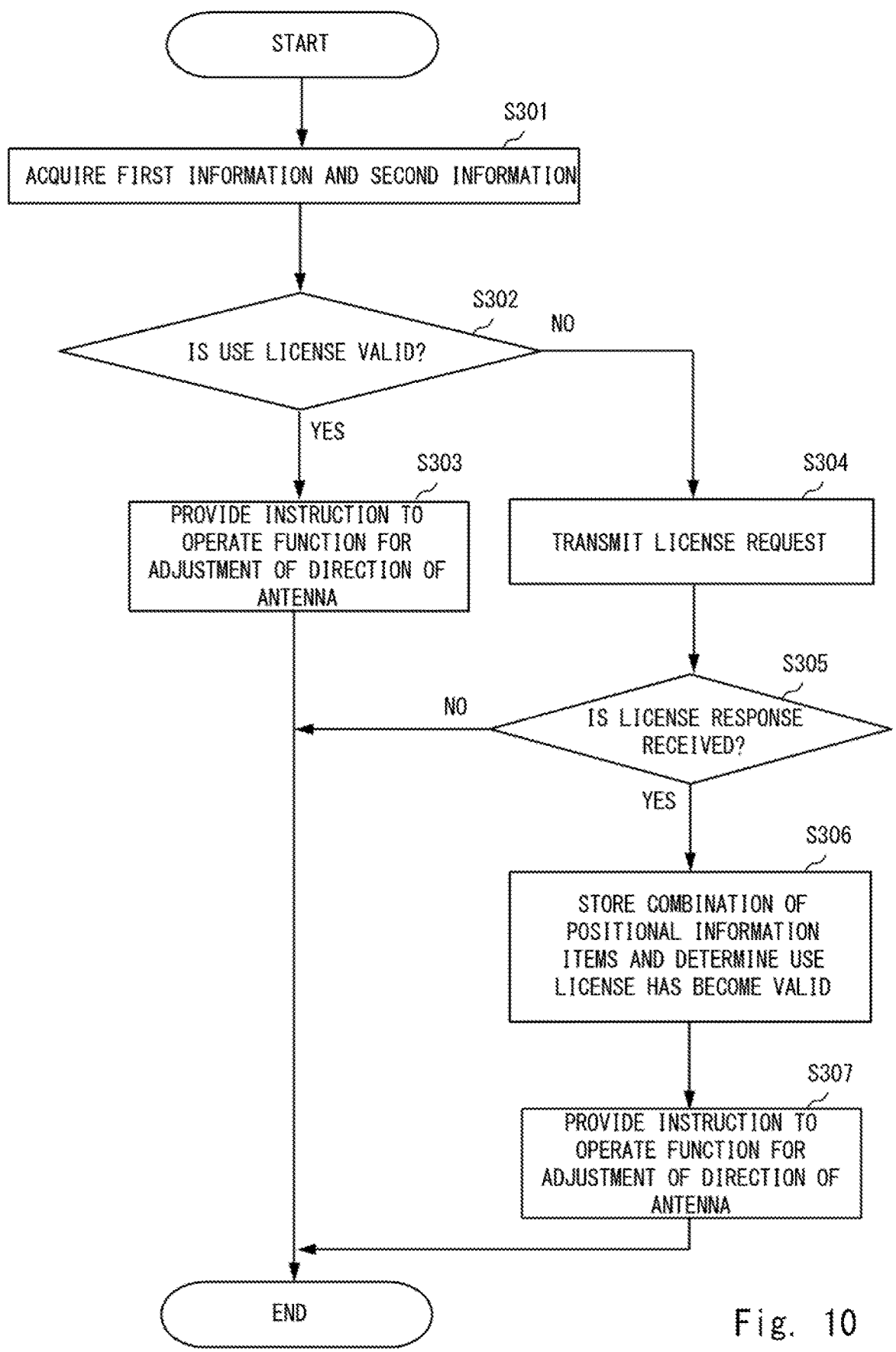
FIG. 10 is a flowchart showing another example of the process performed by the antenna direction adjustment apparatus according to the second example embodiment of the present invention.

Next, another example of processes performed by the antenna direction adjustment apparatus 10A according to the second example embodiment is described with reference to a flowchart shown in FIG. 10. Note that FIG. 10 is a flowchart related to a method for managing the number of licenses by the license management server 30. Note that Steps S301 to S303 are similar to Steps S201 to S203 in FIG. 9, respectively, and thus the descriptions thereof are omitted.

In the antenna direction adjustment apparatus 10A, if the use license of the function for the adjustment of the direction of the antenna 1 is not valid, the determination unit 12A transmits a license request including the combination of the first positional information and the second positional information to the license management server 30 (Step S304).

Next, in the antenna direction adjustment apparatus 10A, the determination unit 12A determines whether a license response indicating that the license is valid is received (Step S305).

If the license response indicating that the license is valid is not received (NO in Step S305), the process ends. On the other hand, in the antenna direction adjustment apparatus 10A, if the license response indicating that the license is valid is received (YES in Step S305), the determination unit 12A stores the combination of the first positional information and the second positional information in the management register 15, and determines that the use license of the function (the auxiliary unit 14) for the adjustment of the direction of the antenna 1 has become valid (Step S306).

Then, in the antenna direction adjustment apparatus 10A, the instruction unit 13 provides an instruction to operate the function for the adjustment of the direction of the antenna 1 (Step S307).

Next, two examples of a method for increasing the number of licenses of the antenna direction adjustment apparatus 10A are described.

A first example is a method for increasing the number of licenses in regard to the method for managing the number of licenses by the antenna direction adjustment apparatus 10A.

A user of the antenna direction adjustment apparatus 10A makes an application for a license assignment, which includes the identification information of the antenna direction adjustment apparatus 10A and the number of licenses to be added, to a vendor. Note that the identification information of the antenna direction adjustment apparatus 10A is, for example, the serial number of the antenna direction adjustment apparatus 10A.

A vendor creates a license key, for example, using a license key creation server. Then, the vendor provides the created license key to a user.

A user installs a license key in the antenna direction adjustment apparatus 10A using a Universal Serial Bus (USB) memory or the like. By doing so, the number of remaining licenses in the management register 15 is increased by the number of licenses for which the user has applied. That is, the number of remaining licenses after the license key is installed is a number obtained by adding the number of licenses for which the user has applied to the number of remaining licenses before the license key is installed.

A second example is a method for increasing the number of licenses in regard to the method for managing the number of licenses by the license management server 30.

A user of the antenna direction adjustment apparatus 10A makes an application for a license assignment, which includes the identification information of the antenna direction adjustment apparatus 10A and the number of licenses to be added, to the license management server 30.

The control unit 31 of the license management server 30 increases the number of remaining licenses of the antenna direction adjustment apparatus 10A in the management register 32 by the number of licenses for which the user has applied.

Next, a method for storing the same information in both the management register 15 of the antenna direction adjustment apparatus 10A and the management register 25 of the antenna direction adjustment apparatus 20A is described. Note that by using this method, for example, the information of the license No. 1 in the example of FIG. 6 is stored in the management registers 15 and 25. Then, it is possible for the antenna direction adjustment apparatus 10A to operate a function for the adjustment of the direction of the antenna 1 by the license No. 1. Further, it is possible for the antenna direction adjustment apparatus 20A to operate a function for the adjustment of the direction of the antenna 3 by the license No. 1. That is, it is possible for the antenna direction adjustment apparatuses 10A and 20A to operate both of the auxiliary units 14 and 24 by one license for the combination of the locations A and B.

A first example is a method for storing the same information in both of the management registers 15 and 25 in regard to the method for managing the number of licenses by the antenna direction adjustment apparatuses 10A and 20A.

For example, a user copies the combination of the positional information of the location A and the positional information of the location B stored in one management register to the other management register using a USB memory or the like. Note that the information stored in the one management register may be copied to the other management register by transmitting that information through a mobile phone line, an Internet line, or the like between the antenna direction adjustment apparatuses 10A and 20A. In this way, the combination of the positional information of the location A and the positional information of the location B is stored in both of the management registers 15 and 25.

A second example is a method for storing the same information in both of the management registers 15 and 25 in regard to the method for managing the number of licenses by the license management server 30.

In the management register 32 of the license management server 30, information on the combination of the positional information items related to assigned licenses is stored in addition to the remaining license number information in each of the plurality of antenna direction adjustment apparatuses.

When the control unit 31 of the license management server 30 receives the license request, it determines whether a license has already been assigned for the combination of the first positional information and the second positional information included in the license request by referring to the management register 32.

For example, it is assumed that one license has already been assigned by the antenna direction adjustment apparatus 10A for the combination of the positional information of the location A and the positional information of the location B. In this case, when the control unit 31 receives the license request including the combination of the positional information of the location A and the positional information of the location B from the antenna direction adjustment apparatus 20A, the control unit 31 determines that the license has already been assigned by referring to the management register 32. Then, the control unit 31 transmits a license response indicating that the license is valid to the antenna direction adjustment apparatus 20A without reducing the number of remaining licenses for the antenna direction adjustment apparatus 20A. In this way, the combination of the positional information of the location A and the positional information of the location B is stored in the management register 25 of the antenna direction adjustment apparatus 20A. That is, the combination of the positional information of the location A and the positional information of the location B is stored in both of the management registers 15 and 25.

As described above, the antenna direction adjustment apparatus 10A according to the second example embodiment of the present invention is configured to use positional information as the first information and the second information. That is, the antenna direction adjustment apparatus 10A is configured to determine whether the use license of the auxiliary unit 14 is valid based on the combination of the first positional information and the second positional information. By doing so, for example, in the example shown in FIG. 4, it is possible to make the use license for the opposite radio communication between the radio communication apparatuses 2 and 4 and the use license for the opposite radio communication between the radio communication apparatuses 6 and 8 different from each other in the antenna direction adjustment apparatus 10A.

Further, the antenna direction adjustment apparatus 10A further includes the management register 15 that stores a combination of positional information items having a use license. Furthermore, the antenna direction adjustment apparatus 10A is configured so that the determination unit 12A determines that the use license of the auxiliary unit 14 is valid when the combination of the first positional information and the second positional information matches the combination of the positional information items stored in the management register 15. By doing so, in the antenna direction adjustment apparatus 10A, it is possible to use the function for adjustment of a direction of an antenna without limitation on the number of activations/terminations and the use time when the combination of the first positional information and the second positional information has been stored in the management register 15.

Note that the antenna direction adjustment apparatus 10A may be configured to cause the management register 15 to further store the remaining license number information. Further, the antenna direction adjustment apparatus 10A may be configured so that the determination unit 12A checks the remaining license number information when the combination of the first positional information and the second positional information does not match the combination of the positional information items stored in the management register 15. Furthermore, the antenna direction adjustment apparatus 10A may be configured to, when there is a remaining license, reduce the remaining license number of the remaining license number information by one and determine that the use license of the auxiliary unit 14 is valid. By doing so, in the antenna direction adjustment apparatus 10A, it is possible to use one remaining license and validate the use license of the auxiliary unit 14 for the combination of the first positional information and the second positional information by the process performed only by the antenna direction adjustment apparatus 10A.

Further, the antenna direction adjustment apparatus 10A may be configured so that the determination unit 12A stores the combination of the first positional information and the second positional information in the management register 15 when the number of remaining licenses of the remaining license number information is reduced by one. By doing so, in the antenna direction adjustment apparatus 10A, it is possible to use the function for an adjustment of a direction of an antenna without the number of remaining licenses being reduced when the function for the adjustment of the direction of the antenna is again used with the same combination of the first positional information and the second positional information.

Note that the antenna direction adjustment apparatus 10A may be configured so that the determination unit 12A transmits a license request including the combination of the first positional information and the second positional information to the license management server 30 when the combination of the first positional information and the second positional information does not match the combination of the positional information items stored in the management register 15. Further, the antenna direction adjustment apparatus 10A may be configured so that the determination unit 12A determines that the use license of the auxiliary unit 14 is valid when the license response indicating that the license is valid is received from the license management server 30. By doing so, in the antenna direction adjustment apparatus 10A, it is possible to use one remaining license and validate the use license of the auxiliary unit 14 for the combination of the first positional information and the second positional information by the processes performed by the antenna direction adjustment apparatus 10A and the license management server 30.

Further, the antenna direction adjustment apparatus 10A may be configured so that the determination unit 12A stores the combination of the first positional information and the second positional information in the management register 15 when the license response indicating that the license is valid is received from the license management server 30. By doing so, in the antenna direction adjustment apparatus 10A, it is possible to use the function for an adjustment of a direction of an antenna without the number of remaining licenses being reduced when the function for the adjustment of the direction of the antenna is again used with the same combination of the first positional information and the second positional information.

Further, in the antenna direction adjustment system 100A, the same information is stored in both the management register 15 included in the antenna direction adjustment apparatus 10A and the management register 25 included in the antenna direction adjustment apparatus 20A. Accordingly, for the combination of the positional information for which the use license is valid in one antenna direction adjustment apparatus, the use license can be validated in the other antenna direction adjustment apparatus without the number of remaining licenses being reduced.

Note that the antenna direction adjustment apparatus 10A may not include the management register 15. In this case, in the antenna direction adjustment apparatus 10A, the determination unit 12A may ask the license management server 30 each time whether the use license of the auxiliary unit 14 for the combination of the first positional information and the second positional information is valid.

Third Example Embodiment

Next, an antenna direction adjustment system 100B according to a third example embodiment of the present invention is described. The antenna direction adjustment system 100B according to the third example embodiment uses apparatus information as first information and the second information. Note that the apparatus information is identification information of the radio communication apparatuses, and is information unique to each radio communication apparatus. For example, a Media Access Control (MAC) address is used as the apparatus information. The antenna direction adjustment system 100B includes a first antenna, a first radio communication apparatus, an antenna direction adjustment apparatus 10B, a second antenna, a second radio communication apparatus, and an antenna direction adjustment apparatus 20B. Note that in the antenna direction adjustment system 100B according to the third example embodiment, the description that the positional information in the antenna direction adjustment system 100A according to the second example embodiment has been simply replaced with the apparatus information is omitted as appropriate.

Figure 11:
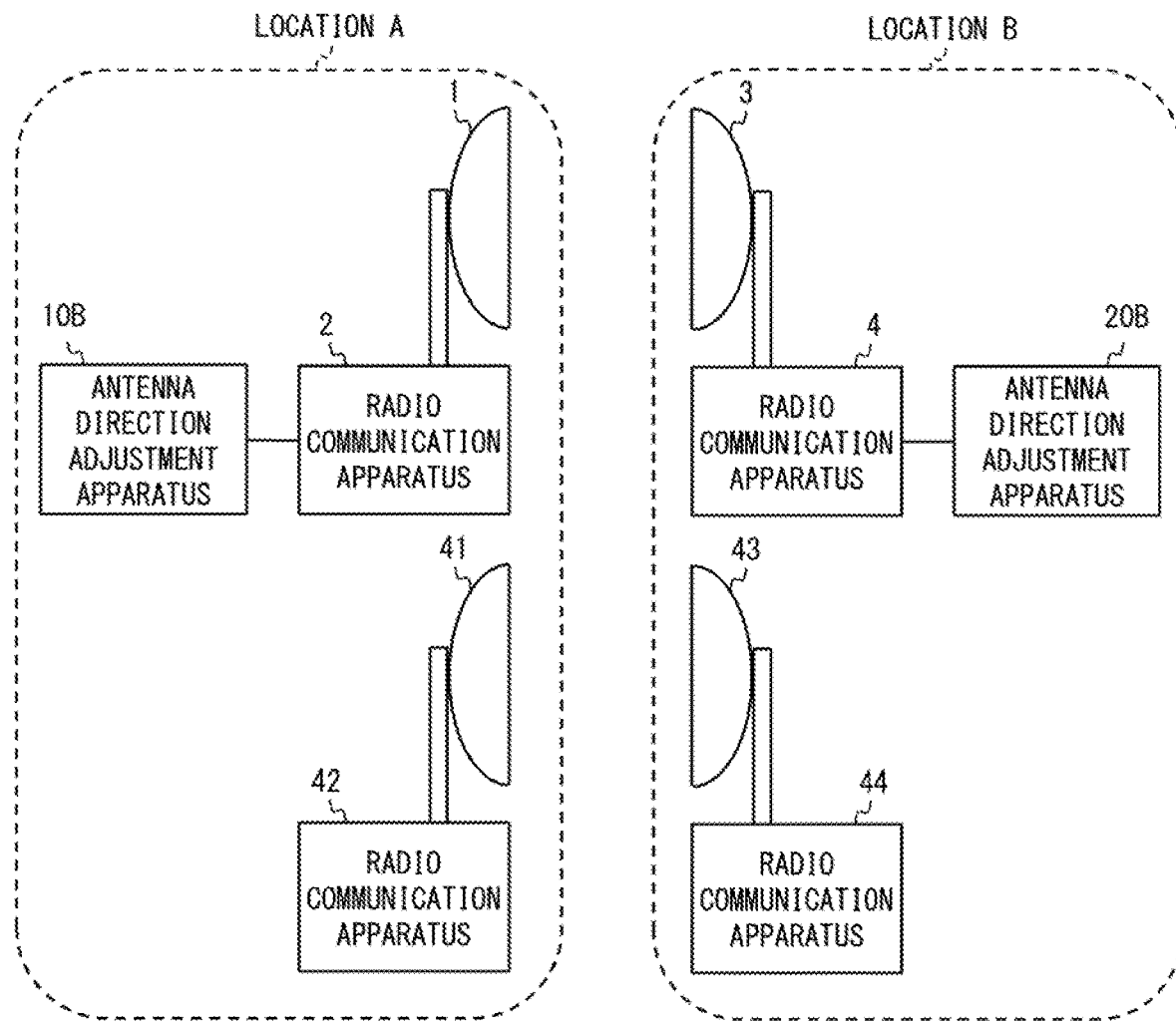
FIG. 11 is a block diagram showing an example of an installation environment of the antenna and the radio communication apparatus according to a third example embodiment of the present invention.

In the third example embodiment, an example of an installation environment of the antenna and the radio communication apparatus in FIG. 11 is described. In the example of FIG. 11, the antenna 1, the radio communication apparatus 2, an antenna 41, and a radio communication apparatus 42 are installed at a location A. Further, the antenna 3, the radio communication apparatus 4, an antenna 43, and a radio communication apparatus 44 are installed at a location B.

In FIG. 11, the radio communication apparatus 2 is connected to the antenna direction adjustment apparatus 10B, and the radio communication apparatus 4 is connected to the antenna direction adjustment apparatus 20B. In this connection state, the first antenna, the first radio communication apparatus, the second antenna, and the second radio communication apparatus are the antenna 1, the radio communication apparatus 2, the antenna 3, and the radio communication apparatus 4, respectively.

Further, the antenna 41 and the radio communication apparatus 42 are connected to each other, and the antenna 43 and the radio communication apparatus 44 are connected to each other. Further, the antennas 41 and 43 are, for example, parabolic antennas. The antennas 41 and 43 are located so that they face each other. The radio communication apparatuses 42 and 44 perform opposite radio communication through the antennas 41 and 43. Note that for example, the opposite radio communication line between the radio communication apparatus 42 and the radio communication apparatus 44 is a redundant line of the opposite radio communication line between the radio communication apparatus 2 and the radio communication apparatus 4.

Next, a configuration example of the antenna direction adjustment apparatus 10B is described. The antenna direction adjustment apparatus 10B includes an acquisition unit 11B, a determination unit 12B, the instruction unit 13, the auxiliary unit 14, and management register 15. Note that the configuration of the antenna direction adjustment apparatus 10B is similar to that of the antenna direction adjustment apparatus 10A according to the second example embodiment, and the illustration thereof is thus omitted. Note that as in the case of the antenna direction adjustment apparatus 10B, the antenna direction adjustment apparatus 20B includes an acquisition unit 21B, a determination unit 22B, the instruction unit 23, the auxiliary unit 24, and a management register 25.

The acquisition unit 11B acquires first apparatus information related to the radio communication apparatus 2, and second apparatus information related to the radio communication apparatus 4.

Note that the acquisition unit 11B acquires the first apparatus information related to the radio communication apparatus 2 from the radio communication apparatus 2, for example, by a Link Layer Discovery Protocol (LLDP). Further, the acquisition unit 21B acquires the second apparatus information related to the radio communication apparatus 4 from the radio communication apparatus 2, for example, by an LLDP. Further, the acquisition unit 11B acquires the second apparatus information related to the radio communication apparatus 4 from the antenna direction adjustment apparatus 20B, for example, using a mobile phone line or an Internet line.

Then, the acquisition unit 11B outputs the acquired first apparatus information and second apparatus information to the determination unit 12B.

The determination unit 12B receives the first apparatus information and the second apparatus information from the acquisition unit 11B. Further, the determination unit 12B determines whether the use license of the auxiliary unit 14 is valid based on the combination of the first apparatus information and the second apparatus information. The determination unit 12B determines whether the use license of the auxiliary unit 14 is valid, for example, by referring to the management register 15.

Note that the determination unit 12B may determine that the use license of the auxiliary unit 14 is valid when the first apparatus information and the second apparatus information are specific apparatus information items.

Further, in this case, identification information indicating a product of the same vendor as that of the antenna direction adjustment apparatus 10B may be used as the specific apparatus information. For example, when a MAC address is used as the apparatus information, an Organizationally Unique Identifier (OUI) indicating a product of the same vendor as that of the antenna direction adjustment apparatus 10B may be used as the specific apparatus information.

An example using specific apparatus information is described with reference to FIG. 11. It is assumed that the combination of the apparatus information of the radio communication apparatus 42 and the apparatus information of the radio communication apparatus 44 is not stored in the management register 15. Further, it is assumed that the antenna direction adjustment apparatus 10B, the radio communication apparatus 42, and the radio communication apparatus 44 are products of the same vendor.

In FIG. 11, when the antenna direction adjustment apparatus 10B is connected to the radio communication apparatus 42 and the antenna direction adjustment apparatus 20B is connected to the radio communication apparatus 44, the first apparatus information is the apparatus information of the radio communication apparatus 42, and the second apparatus information is the apparatus information of the radio communication apparatus 44. Then, as the combination of the apparatus information of the radio communication apparatus 42 and the apparatus information of the radio communication apparatus 44 does not match the combination of the apparatus information items stored in the management register 15, it is usually necessary to validate the use license of the auxiliary unit 14 by using one remaining license. However, when the identification information indicating a product of the same vendor as that of the antenna direction adjustment apparatus 10B as a specific apparatus information, the antenna direction adjustment apparatus 10B determines that the use license of the auxiliary unit 14 is valid without using the remaining license.

That is, in the case in which the first apparatus information and the second apparatus information are specific apparatus information items, the determination unit 12B determines as follows when the combination of the first apparatus information and the second apparatus information does not match the combination of the information items stored in the management register 15. In a method for managing the number of licenses by the antenna direction adjustment apparatus 10B, the determination unit 12B determines that the use license of the auxiliary unit 14 is valid without reducing the number of remaining licenses of the remaining license number information in the management register 15. Further, in a method for managing the number of licenses by the license management server 30, the determination unit 12B determines that the use license of the auxiliary unit 14 is valid without transmitting a license request to the license management server 30.

As described above, the antenna direction adjustment apparatus 10B according to the third example embodiment of the present invention is configured to use apparatus information as the first information and the second information. That is, the antenna direction adjustment apparatus 10B is configured to determine whether the use license of the auxiliary unit 14 is valid based on the combination of the first apparatus information and the second apparatus information. By doing so, for example, in the example shown in FIG. 11, it is possible to make the use license for the opposite radio communication between the radio communication apparatuses 2 and 4 and the use license for the opposite radio communication between the radio communication apparatuses 42 and 44 different from each other in the antenna direction adjustment apparatus 10B.

Further, the antenna direction adjustment apparatus 10B is configured so that the determination unit 12b determines that the use license of the auxiliary unit 14 is valid when the first apparatus information and the second apparatus information are specific apparatus information items. By doing so, it is possible to provide a function for adjustment of a direction of an antenna to a user who uses a specific radio communication apparatus without a use license being assigned.

Fourth Example Embodiment

Next, an antenna direction adjustment system 100C according to a fourth example embodiment of the present invention is described. The antenna direction adjustment system 100C according to the fourth example embodiment uses both positional information and apparatus information as first information and the second information. The antenna direction adjustment system 100C includes the antenna 1, the radio communication apparatus 2, an antenna direction adjustment apparatus 10C, the antenna 3, the radio communication apparatus 4, and an antenna direction adjustment apparatus 20C. Note that in the antenna direction adjustment system 100C according to the fourth example embodiment, the description of the antenna direction adjustment system 100A according to the second example embodiment or the antenna direction adjustment system 100B according to the third example embodiment is omitted as appropriate.

Next, a configuration example of the antenna direction adjustment apparatus 10C is described. The antenna direction adjustment apparatus 10C includes an acquisition unit 11C, a determination unit 12C, the instruction unit 13, the auxiliary unit 14, and management register 15. Note that as in the case of the antenna direction adjustment apparatus 10C, the antenna direction adjustment apparatus 20C includes an acquisition unit 21C, a determination unit 22C, the instruction unit 23, the auxiliary unit 24, and a management register 25.

The acquisition unit 11C acquires first positional information and first apparatus information related to the radio communication apparatus 2. Further, the acquisition unit 11C acquires second positional information and second apparatus information related to the radio communication apparatus 4.

Then, the acquisition unit 11C outputs the acquired first positional information, first apparatus information, second positional information, and second apparatus information to the determination unit 12C.

The determination unit 12C receives the first positional information, the first apparatus information, the second positional information, and the second apparatus information from the acquisition unit 11C. Further, the determination unit 12C determines whether the use license of the auxiliary unit 14 is valid based on the combination of the first positional information, the first apparatus information, the second positional information, and the second apparatus information.

The determination unit 12C determines whether the use license of the auxiliary unit 14 is valid, for example, by referring to the management register 15. That is, the determination unit 12C determines that the use license of the auxiliary unit 14 is valid when the combination of the first positional information, the first apparatus information, the second positional information, and the second apparatus information matches the combination of the positional information items stored in the management register 15.

As described above, the antenna direction adjustment apparatus 10C according to the fourth example embodiment of the present invention is configured to use both of positional information and apparatus information as the first information and the second information. That is, the antenna direction adjustment apparatus 10C is configured to determine whether the use license of the auxiliary unit 14 is valid based on the combination of the first positional information, the first apparatus information, the second positional information, and the second apparatus information. By doing so, in the antenna direction adjustment apparatus 10C, the use license can be managed more closely than it is managed only by positional information or only by the apparatus information.

Figure 12:
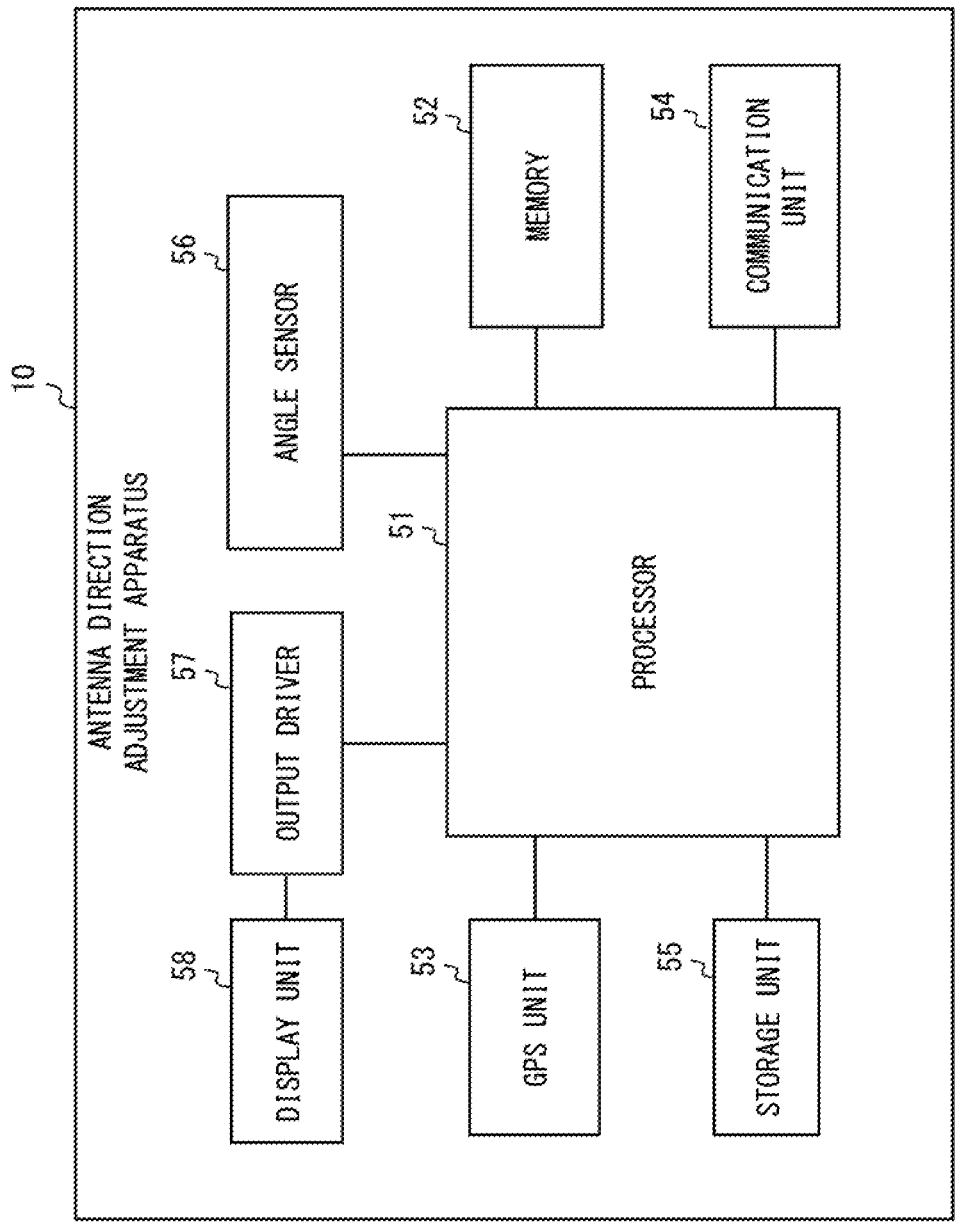
FIG. 12 is a block diagram showing a configuration example of the antenna direction adjustment apparatus according to the example embodiment of the present invention.

Note that for example, the antenna direction adjustment apparatuses 10, 10A, 10B, and 10C described in the above example embodiments may each be configured as shown in a block diagram of FIG. 12. In the example of FIG. 12, the antenna direction adjustment apparatus 10 includes a processor 51, a memory 52, a GPS unit 53, a communication unit 54, a storage unit 55, an angle sensor 56, an output driver 57, and a display unit 58.

The processor 51 performs overall control of the antenna direction adjustment apparatus 10. The processor 51 is, for example, a Central Processing Unit (CPU), or a Micro Processor Unit (MPU).

A program for causing the processor 51 to function as each means of the antenna direction adjustment apparatus 10 is stored in the memory 52. Specifically, a program for causing the processor 51 to function as the acquisition unit 11, the determination unit 12, the instruction unit 13, and the auxiliary unit 14 is stored in the memory 52.

In the second and fourth example embodiments, the GPS unit 53 is used when the first positional information related to the first radio communication apparatus is acquired.

The communication unit 54 performs communication with the antenna direction adjustment apparatus 20, communication with the first radio communication apparatus, and communication with the license management server 30.

The communication unit 54 transmits and receives the second information related to the second radio communication apparatus to and from the antenna direction adjustment apparatus 20.

Further, the communication unit 54 receives, from the first radio communication apparatus, the reception electric field intensity of the signal, which is transmitted from the second radio communication apparatus and received in the first radio communication apparatus. Note that this reception electric field intensity is used to execute a function for the adjustment of the direction of the first antenna.

Further, the communication unit 54 transmits a license request and receives a license response to and from the license management server 30.

The storage unit 55 is used, for example, as the management register 15. Further, data associating an angle of the first antenna with the reception electric field intensity at the angle of the first antenna may be stored in the storage unit 55.

The angle sensor 56 is used to detect the angle of the first antenna. The angle sensor 56 is, for example, a gyro sensor.

For example, the display unit 58 displays the angle of the first antenna and the reception electric field intensity at the angle of the first antenna in association with each other. The display unit 58 may display information indicating that there is no remaining license when there is no remaining license. Note that the output driver 57 is a driver for operating the display unit 58.

Note that in the above-described examples, the program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, a CD-R/W, and a semiconductor memory (such as a mask ROM, a PROM (Programmable ROM), an EPROM (Erasable PROM), a flash ROM, and a RAM (Random Access Memory). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Although the present invention is described above with reference to embodiments, the present invention is not limited to the above-described embodiments. Various modifications that can be understood by those skilled in the art can be made to the configuration and details of the present invention within the scope of the invention.

This application is based upon and claims the benefit of priority from Japanese patent application No. 2017-124152, filed on Jun. 26, 2017, the disclosure of which is incorporated herein in its entirety by reference.

REFERENCE SIGNS LIST

1 ANTENNA (FIRST ANTENNA)
2 RADIO COMMUNICATION APPARATUS (FIRST RADIO COMMUNICATION APPARATUS)
3 ANTENNA (SECOND ANTENNA)
4 RADIO COMMUNICATION APPARATUS (SECOND RADIO COMMUNICATION APPARATUS)
10, 10A, 10B, 10C ANTENNA DIRECTION ADJUSTMENT APPARATUS (FIRST ANTENNA DIRECTION ADJUSTMENT APPARATUS)
11, 11A, 11B, 11C ACQUISITION UNIT (FIRST ACQUISITION UNIT)
12, 12A, 12B, 12C DETERMINATION UNIT (FIRST DETERMINATION UNIT)
13 INSTRUCTION UNIT (FIRST INSTRUCTION UNIT)
14 AUXILIARY UNIT (FIRST AUXILIARY UNIT)
15 MANAGEMENT REGISTER (FIRST MANAGEMENT REGISTER)
20, 20A, 20B, 20C ANTENNA DIRECTION ADJUSTMENT APPARATUS (SECOND ANTENNA DIRECTION ADJUSTMENT APPARATUS)
21, 21A, 21B, 21C ACQUISITION UNIT (SECOND ACQUISITION UNIT)
22, 22A, 22B, 22C DETERMINATION UNIT (SECOND DETERMINATION UNIT)
23 INSTRUCTION UNIT (SECOND INSTRUCTION UNIT)
24 AUXILIARY UNIT (SECOND AUXILIARY UNIT)
25 MANAGEMENT REGISTER (SECOND MANAGEMENT REGISTER)
30 LICENSE MANAGEMENT SERVER

The invention claimed is:

1. An antenna direction adjustment apparatus comprising a memory and a processor configured to execute:
an auxiliary unit configured to adjust a direction of an antenna;
an acquisition unit configured to acquire first information related to a first radio communication apparatus, and second information related to a second radio communication apparatus configured to perform opposite radio communication with the first radio communication apparatus;
a determination unit configured to determine whether a use license of the auxiliary unit is valid based on a combination of the first information and the second information; and
an instruction unit configured to provide an instruction to operate the auxiliary unit when it is determined that the use license is valid, wherein
the auxiliary unit adjusts the direction of the antenna when the auxiliary unit receives the instruction form the instruction unit.

2. The antenna direction adjustment apparatus according to claim 1, wherein the memory comprises a management register configured to store a combination of information items having a use license, wherein
the determination unit determines that the use license is valid when the combination of the first information and the second information matches the combination of the information items stored in the management register.

3. The antenna direction adjustment apparatus according to claim 2, wherein
the management register further comprises remaining license number information, and the determination unit checks the remaining license number information when the combination of the first information and the second information does not match the combination of the information items stored in the management register, and reduces the number of remaining licenses of the remaining license number information by one and determines that the use license is valid.

4. The antenna direction adjustment apparatus according to claim 3, wherein the determination unit stores the combination of the first information and the second information in the management register when the determination unit reduces the number of remaining licenses by one.

5. The antenna direction adjustment apparatus according to claim 2, wherein
the determination unit
transmits a license request including the combination of the first information and the second information to a license management server when the combination of the first information and the second information does not match the combination of the information items stored in the management register, and
determines that the use license is valid when a license response indicating that the license is valid is received from the license management server.

6. The antenna direction adjustment apparatus according to claim 5, wherein the determination unit stores the combination of the first information and the second information in the management register when the determination unit receives the license response.

7. The antenna direction adjustment apparatus according to claim 1, wherein the first information and the second information are at least one of positional information and apparatus information.

8. The antenna direction adjustment apparatus according to claim 3, wherein
the first information and the second information include apparatus information, and the determination unit determines that the use license is valid when the apparatus information in the first information and the apparatus information in the second information are specific apparatus information items.

9. An antenna direction adjustment system comprising:
a first radio communication apparatus;
a first antenna connected to the first radio communication apparatus;
a first antenna direction adjustment apparatus;
a second radio communication apparatus configured to perform opposite radio communication with the first radio communication apparatus;
a second antenna connected to the second radio communication apparatus; and
a second antenna direction adjustment apparatus, wherein
the first antenna direction adjustment apparatus comprises
a first memory and a first processor configured to execute:
a first auxiliary unit configured to adjust of a direction of a first antenna;
a first acquisition unit configured to acquire first information related to the first radio communication apparatus, and second information related to the second radio communication apparatus;
a first determination unit configured to determine whether a use license of the first auxiliary unit is valid based on a combination of the first information and the second information;
a first instruction unit configured to provide an instruction to operate the first auxiliary unit when the first determination unit determines that the use license is valid, and the second antenna direction adjustment apparatus comprises a second memory and a second processor configured to execute:
a second auxiliary unit configured to adjust of a direction of the second antenna;
a second acquisition unit configured to acquire the first information and second information;
a second determination unit configured to determine whether a use license of the second auxiliary unit is valid based on a combination of the first information and the second information; and
a second instruction unit configured to provide an instruction to operate the second auxiliary unit when the second determination unit determines that the use license is valid, wherein
the first auxiliary unit adjusts the direction of the first antenna when the first auxiliary unit receives the instruction from the first instruction unit, and
the second auxiliary unit adjusts the direction of the second antenna when the second auxiliary unit receives the instruction from the second instruction unit.

10. The antenna direction adjustment system according to claim 9, wherein
the first memory comprises a first management register configured to store a combination of information items having a use license,
the first determination unit determines that a use license of the first auxiliary unit is valid when the combination of the first information and the second information matches the combination of the information items stored in the first management register,
the second memory comprises a second management register configured to store a combination of information items having a use license, and
the second determination unit determines that a use license of the second auxiliary unit is valid when the combination of the first information and the second information matches the combination of the information items stored in the second management register.

11. The antenna direction adjustment system according to claim 10, wherein the same information is stored in both the first management register and the second management register.

12. A method performed in an antenna direction adjustment apparatus, comprising:
acquiring first information related to a first radio communication apparatus, and second information related to a second radio communication apparatus configured to perform opposite radio communication with the first radio communication apparatus;
determining whether a use license of a function for an adjustment of a direction of an antenna is valid based on a combination of the first information and the second information;
providing an instruction to operate the function for the adjustment of a direction of an antenna when it is determined that the use license is valid; and adjusting the direction of the antenna based on the instruction.

13. The method according to claim 12, wherein the method comprises determining that the use license is valid when the combination of the first information and the second information matches the combination of the information items stored in the management register of the antenna direction adjustment apparatus.

14. The method according to claim 13, wherein the method comprises:
- checking the remaining license number information stored in the management register when the combination of the first information and the second information does not match the combination of the information items stored in the management register; and
- reducing the number of remaining licenses of the remaining license number information by one and determining that the use license is valid.

15. The method according to claim 14, wherein the method comprises storing the combination of the first information and the second information in the management register when the number of remaining licenses is reduced by one.

16. The method according to claim 13, wherein the method comprises:
- transmitting a license request including the combination of the first information and the second information to a license management server when the combination of the first information and the second information does not match the combination of the information items stored in the management register; and
- determining that the use license is valid when a license response indicating that the license is valid is received from the license management server.

17. The method according to claim 16, wherein the method comprises storing the combination of the first information and the second information in the management register when the license response is received.

18. The method according to claim 12, wherein the first information and the second information are at least one of positional information items and apparatus information items.

19. The method according to claim 14, wherein
- the first information and the second information include apparatus information, and
- the method comprises determining that the use license is valid when the apparatus information in the first information and the apparatus information in the second information are specific apparatus information items.

20. A method performed in an antenna direction system, comprising
- causing a first antenna direction adjustment apparatus:
  - to acquire first information related to a first radio communication apparatus, and second information related to a second radio communication apparatus configured to perform opposite radio communication with the first radio communication apparatus;
  - to perform a first determination whether a use license of a function for an adjustment of a direction of the first antenna is valid based on a combination of the first information and the second information;
  - to provide a first instruction to operate the function for the adjustment of direction of the first antenna when the first determination determines that the use license is valid; and
  - to adjust the direction of the first antenna based on the first instruction, and causing a second antenna direction adjustment apparatus:
  - to acquire the first information and the second information;
  - to perform a second determination whether a use license of a function for an adjustment of a direction of the second antenna is valid based on a combination of the first information and the second information;
  - to provide a second instruction to operate the function for the adjustment of a direction of the second antenna when the second determination determines that the use license is valid; and
  - to adjust the direction of the second antenna based on the second instruction.

21. The method according to claim 20, wherein
- the first antenna direction adjustment apparatus determines that the first determination is valid when the combination of the first information and the second information matches the combination of the information items stored in the first management register of the first antenna direction adjustment apparatus, and
- the second antenna direction adjustment apparatus determines that the second determination is valid when the combination of the first information and the second information matches the combination of the information items stored in the second management register of the second antenna direction adjustment apparatus.

22. The method according to claim 21, wherein the same information is stored in both the first management register and the second management register.

* * * * *